June 17, 1930.	L. DE FOREST	1,764,938
METHOD OF PRODUCING TALKING MOTION PICTURE FILMS
Filed April 27, 1927
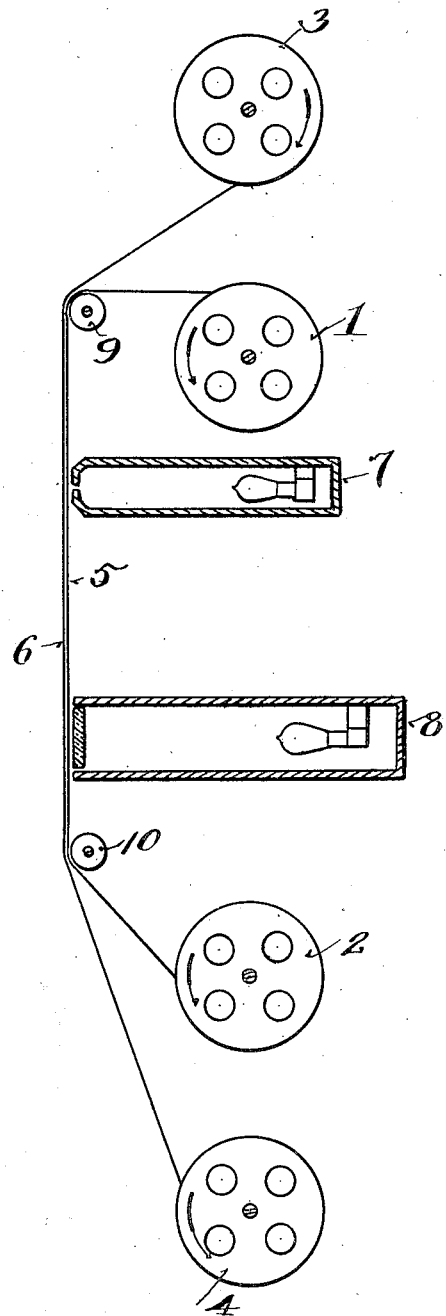
Inventor
Lee De Forest
By his Attorneys Darby + Darby Patented June 17, 1930

1,764,938

UNITED STATES PATENT OFFICE

LEE DE FOREST, OF NEW YORK, N. Y., ASSIGNOR TO DE FOREST PHONOFILM CORPORATION, OF NEW YORK, N. Y., A CORPORATION OF DELAWARE

METHOD OF PRODUCING TALKING-MOTION-PICTURE FILMS

Application filed April 27, 1927. Serial No. 187,026.

This invention relates broadly to the phonofilm or talking motion picture art.

More specifically this invention relates to a novel method of printing a positive film having a sound and picture record thereon of a predetermined separation from a negative film having a sound and picture record thereon with any separation.

A further object of this invention is the provision of a novel method of printing positives of this type which requires relatively simple apparatus and which is adapted to quickly produce efficient results.

These and many other objects are secured by means of my novel method.

This invention resides substantially in the steps and combination of steps as is described more fully hereinafter and defined in the appended claims.

Referring to the drawings, the single figure is a diagrammatic illustration of apparatus employed in effecting the method of this invention.

This invention relates in general and is of a similar nature to the inventions disclosed in my co-pending applications Serial No. 718,643 filed June 7, 1924, and Serial No. 718,642 filed June 7, 1924.

This invention is adapted to secure results similar to those disclosed in the above named applications, but relates to a different method of securing these results.

One of the usual methods of producing films for talking motion pictures comprises simultaneously recording on a negative film the scene to be photographed and a sound record of the speech, music and the like incident to the scenes being photographed. As is well known in the art the pictures are taken on a continuous film strip and the sound record consisting of a series of light and dark spaces is recorded on a narrow band on the film either between the picture and the sprocket perforations or on the outside of the sprocket perforations adjacent the edge of the film. In taking this negative the sound record is longitudinally separated with respect to the incident pictures by a space equal to the distance between the picture and light apertures on the recording machine. The sound record may occur on the film either before or after the picture incident thereto.

Regardless of this relative position of the sound and picture record and regardless of the separation between them on the negative film, it is possible by means of my novel method to produce a positive film having the sound and picture record recorded thereon at any predetermined desired separation.

Referring to the drawings to aid in the disclosure of this invention, I have shown at 1 a reel on which the negative film 5 is wound and its take-up reel 2 and at 3 I have shown a reel 3 on which the positive film stock 6 is wound and its take-up reel 4. These two films 5 and 6 pass in conjunction over the driving sprockets 9 and 10 as is usual and well known in this practice. At 7 is shown a light casing having a slit at one end which is used in printing the sound record and at 8 I have shown another light casing having a window at the end by means of which the picture record is printed.

In carrying out the steps of this invention the films 5 and 6 are passed down over the sprockets 9 and 10 and either the picture or sound portion of the positive film is exposed depending upon which record is desired to print first. If the picture record is printed first the light in casing 8 is ligthed while that in casing 7 is not lighted. As the films 5 and 6 pass by the window of casing 8 the picture portion of the positive is exposed to the light therein and a record of the picture is made on the positive 6. During this operation the sound record portion of the film is left unexposed. After the picture record is completely made on the positive the films are again passed through the device with a predetermined longitudinal separation. This is accomplished by permitting the teeth on the sprockets to engage the perforations on the two films as they pass through the printing device with their predetermined separation longitudinally which is maintained by reason of the engagement of the sprocket projections with the two films. During the operation of printing the sound record on the positive light 8 is out and light 7 is lit. It is at once apparent from the foregoing description that the longitudinal separation of the sound record and its incident pictures may be of any predetermined desired amount regardless of the separation of the sound record and its incident pictures on the negative film.

It is apparent that many changes in the details of construction of the apparatus and the relative sequence of steps will readily occur to those skilled in the art. I am aware, for instance, that the two light casings 7 and 8 may be combined as one casing having two separate apertures, namely, an aperture for printing the pictures and an aperture for printing the sound record. On the first run of the film through the printer the sound or picture aperture, whichever it is desired, may be covered up and on the second run it may be uncovered and the other aperture covered up. I do not, therefore, desire to be limited to my disclosure of the invention as given for purposes of illustration, but rather to the field of the invention as it is defined in the appended claims.

What I seek to secure by United States Letters Patent is:

1. The method of producing a positive of a sound and picture record from a negative having a sound and picture record of any separation comprising running the negative film and a positive film past a light source so as to print the picture record on said positive without exposing the sound portion of said positive and then running the negative and positive films past the light source a second time with the two films longitudinally displaced a predetermined distance in a manner to expose the sound portion of said positive to produce a finished positive film having a sound and picture record thereon with the sound records and their incidental picture records separated any predetermined distance.

2. The method of producing a positive film having sound and picture records thereon from a negative having sound and picture records thereon comprising exposing the picture area of said positive to the picture record of said negative, longitudinally displacing the positive and negative films relatively to each other and exposing the sound area of said positive to the sound record of said negative to produce a positive having the sound and picture records separated a predetermined distance.

In testimony whereof I have hereunto set my hand on this 25th day of April, A. D., 1927.

LEE DE FOREST.